United States Patent [19]

Huschauer et al.

[11] Patent Number: 5,078,100
[45] Date of Patent: Jan. 7, 1992

[54] METHOD AND APPARATUS FOR BURNING SOLID OR SLUDGE-LIKE FUELS IN A FLUIDIZED BED

[75] Inventors: Helmuth Huschauer, Neuss; Ralf J. Heitmüller, Hilden, both of Fed. Rep. of Germany

[73] Assignee: Vereinigte Kesselwerke Aktiengesellschaft, Dusseldorf, Fed. Rep. of Germany

[21] Appl. No.: 668,274

[22] Filed: Mar. 11, 1991

[30] Foreign Application Priority Data

Mar. 10, 1990 [DE] Fed. Rep. of Germany ....... 4007635

[51] Int. Cl.$^5$ .......................... B09B 3/00; F22B 1/00
[52] U.S. Cl. .................... 122/4 D; 110/190; 110/245; 110/346; 110/347
[58] Field of Search ............... 110/346, 245, 190, 347, 110/263, 302; 122/4 D; 431/7; 422/139, 147

[56] References Cited

U.S. PATENT DOCUMENTS

| | | | |
|---|---|---|---|
| 4,419,940 | 12/1983 | Cosar et al. | 110/245 X |
| 4,766,851 | 8/1988 | Emsperger et al. | 122/4 D |
| 5,003,931 | 4/1991 | Huschauer | 122/4 D |
| 5,020,451 | 6/1991 | Maebo et al. | 110/245 X |

OTHER PUBLICATIONS

"Erste Betriebserfahrungen Mit Der Circofluid-Dampferzeugeranlage . . . ", W. Dauber et al., VGB Kraftwerkstechnik 69, Heft 6, Jun. 1989, pp. 584–591.
"Einfluss Unterschiedlicher WST-Systeme Auf Auslegung, Konstruktion Und . . . ", R. Leithner, VGB Kraftwerkstechnik 69, Heft 7, Jul. 1989, pp. 675–694.
"Circofluid-ein neues Konzept fur Dampferzeuger mit Wirbelschichtfeuerung", Von D. Kestner und P. Steller, Vereinigte Kesselwerke AG, Dusseldorf, 11 pages.

Primary Examiner—Edward G. Favors
Attorney, Agent, or Firm—Herbert Dubno

[57] ABSTRACT

A stationary weakly expanded fluid bed for combustion of coal, refuse, sludge and the like has a free space above the fluid bed in which a so-called upper firing is effected with secondary air. The temperature of the secondary air is maintained above the temperature of the fluid bed to handle problems resulting from variations in fuel quality and varying loads and guarantees a stable upper firing.

11 Claims, 2 Drawing Sheets

METHOD AND APPARATUS FOR BURNING SOLID OR SLUDGE-LIKE FUELS IN A FLUIDIZED BED

FIELD OF THE INVENTION

Our present invention relates to a method of burning solid or sludge-like fuels in a weakly expanded fluidized bed, i.e. a system in which a relatively dense fluidized bed containing fuel particles has a free space above it containing a relatively low density suspension which can include fuel particles and separated from the fluidized bed by a sharp demarcation between the densities of the fluidized bed and the free space, combustion being effected with primary air in the fluidized bed and with secondary air in the free space.

BACKGROUND OF THE INVENTION

A process for the burning of solid or sludge-like fuels in a fluidized bed in which a fluidized bed containing fuel particles having a density significantly in excess of 2 kg/m$^3$ is separated by a sharp density demarcation from the free space above the bed in which the particle density may be 1 to 2 kg/m$^3$ and in which combustion in the fluidized bed is effected with primary air and in the free space above the fluidized bed with secondary air is known as the Circofluid Process and is described in a brochure entitled "Circofluid—ein neues Konzept für Dampferzeuger mit Wirbelschichtfeuerung", i.e. "Circofluid—a new concept for steam generators with fluidized bed firing".

It will be understood that the fluidized bed itself can comprise at least 95% (usually between 97% and 98%) inert particles (e.g. ash particles) with particle size in the vicinity of 0.5 mm. Particles of smaller size may be entrained out of the bed while particles of larger size may settle from the bed and can be removed as ash. The density of the fluidized bed, determined primarily by the density of the inert materials thereof, can be for example 800 to 1000 kg/m$^3$ and about 10 to 20% less than the bulk density of the materials of the bed. The fuel in the bed, which makes up only a small fraction can be added in a particle size range generally of 8 to 10 mm, although it is not unusual to supply particles of up to 25 mm in size.

In this process, the velocity of the fluidizing air formed by the primary air is so selected that finer particles are entrained out of the fluidized bed and with the combustion gas into the free space above the fluidized bed. In this manner, it is possible to maintain a suspension density in the free space above the fluidized bed at 1 to 2 kg/m$^3$. The entrained particles, including fine fuel particles with a particle size less than 0.5 mm and usually below 0.4 mm and combustible gas components including volatiles driven off from the fuel in the fluidized bed, burn in the free space.

Since only about 60% of the heat value of the fuel is liberated in the fluidized bed, the heat value liberated in the free space above the fluidized bed is the remainder, namely about 40% of the total heat. Correspondingly, at full loaded operation, approximately 40% of the combustion air must be supplied as secondary air. The fluidized bed temperature in the brochure in the case of the burning of bituminous coal is given as 850° C. It must be held constant within narrow limitations to insure an optimum desulfurization in the fluidized bed.

The temperature in the fluidized bed is controlled by feeding back a metered quantity of cooled flyash. The radiant heating surfaces of the combustion chamber are matched to the heat liberated. The heat transfer at the boiler walls is determined by the size of the effective heating surfaces or their construction and the tamping mass lining the chamber so that the free space temperature remains about 800° to 950° C.

The secondary air proportion is reduced on partial loading of the apparatus since a substantially constant quality of air is required to fluidize the bed and thus a greater proportion of the fuel must be burned in the bed. The proportion of the fuel which burns in the bed is, in turn, dependent upon the characteristics of the fuel, for example, its specific comminution or pulverization characteristics, its expanding or swelling characteristics, its reactivity, its volatiles content and the like. Since a fluidized bed combustion is especially advantageous for ballast-containing fuels, it may be desirable to provide a basic firing with, for example, coal, to which auxiliary fuels may be added, for example, waste gases from a coke oven, sludge from a coal treatment plant or a sewage clarifier, supplied in uncontrollable amounts. Ballast-rich fuels, moreover, show substantial variations in fuel quality.

Because of the variations in loading of the apparatus, changes in fuel quality and variations in the amounts, types and characteristics of auxiliary fuels, the temperature in the free space tends to vary greatly in the earlier system even if the fluidized bed temperature is held more or less constant. When the free space temperature falls too sharply, the ignition of fuel particles entrained from the fluidized bed and thus the final combustion deteriorates. In addition, in such cases, high levels of emissions, carbon monoxide and sulfur dioxide may arise.

OBJECTS OF THE INVENTION

It is the principal object of our present invention to provide a process which improves upon the Circofluid process previously described and can insure, even under nonoptimum conditions with respect to the character of the fuel, a high degree of final combustion and low emission.

Another object of this invention is to provide a method which avoids drawbacks of the earlier system and allows uniform good final combustion with low emission levels.

Yet another object of the invention is to provide a high efficiency system for the combustion of solid and sludge-like fuels.

SUMMARY OF THE INVENTION

These objects and others which will become apparent hereinafter are attained, in accordance with the invention, in a method of burning a fuel which comprises the steps of:

(a) forming a weakly expanded fuel-containing fluidized bed of particles predominantly having a particle size above about 0.5 mm and a suspension density substantially greater than 2 kg/m$^3$ and ranging up to a bulk density of the particles, and having above the bed a free space into which fuel particles with a particle size up to about 0.5 mm are entrained from the bed along with combustible volatile substances in combustion gases leaving the bed, the free space having a suspension density of 1 to 2 kg/m$^3$;

(b) preheating air in indirect heat exchange with a flue gas formed by the combustion gases, feeding a portion of the preheated air to the fluidized bed as primary combustion air and burning with the primary combustion air in the fluidized bed, and feeding another portion of the preheated air to the free space as secondary combustion air to burn fuel particles and volatiles in the free space to form the flue gas and flyash entrained therewith;

(c) recovering flyash from the flue gas and cooling the flyash;

(d) recycling at least some of the recovered and cooled flyash to the fluidized bed at a controlled rate maintaining a temperature of the fluidized bed substantially constant; and (e) controlling a temperature of the secondary combustion air fed to the free space to maintain a temperature therein which is greater than the temperature of the fluidized bed.

When the fuel is bituminous coal, the temperature of the fluidized bed is preferably maintained at substantially 830° to 860° C. and the temperature and the free space at substantially 940° to 980° C. When the fuel is lignite or peat, the temperature of the fluidized bed should be maintained at substantially 750° to 780° C. while the temperature in the free space is maintained at substantially 800° to 860° C.

When the fuel is sludge or refuse, the temperature of the fluidized bed should be maintained at 820° to 900° C. and the temperature in the free space 860° to 950° C.

Thus a temperature difference between the free space and the fluidized bed in the case of bituminous coal is preferably at least 100° C., in the case of lignite or peat is at least 40° C. and in the case of sludge or refuse is at least 30° C.

A part of the secondary combustion air is preferably heated, for example, in indirect heat exchange with the fluidized bed, and is then mixed in variable quantities with another part of the secondary combustion air for feeding to the free space.

According to another aspect of the invention, an apparatus for burning a fuel comprises:

means for forming a weakly expanded fuel-containing fluidized bed of particles predominantly having a particle size above about 0.5 mm and a suspension density substantially greater than 2 kg/m$^3$ and ranging up to a bulk density of the particles, and having above the bed a free space into which fuel particles with a particle size up to about 0.5 mm are entrained from the bed along with combustible volatile substances in combustion gases leaving the bed, the free space having a suspension density of 1 to 2 kg/m$^3$;

means for preheating air in indirect heat exchange with a flue gas formed by the combustion gases, feeding a portion of the preheated air to the fluidized bed as primary combustion air and burning the fuel with the primary combustion air in the fluidized bed, and feeding another portion of the preheated air to the free space as secondary combustion air to burn fuel particles and volatiles in the free space to form the flue gas and flyash entrained therewith;

means for recovering flyash from the flue gas and cooling the flyash;

means for recycling at least some of the recovered and cooled flyash to the fluidized bed at a controlled rate maintaining a temperature of the fluidized bed substantially constant; and means for controlling a temperature of the secondary combustion air fed to the free space to maintain a temperature therein which is greater than the temperature of the fluidized bed.

Preferably, the means for controlling a temperature of the secondary combustion air includes means for passing a first part of the secondary combustion air in indirect heat exchange with the fluidized bed.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
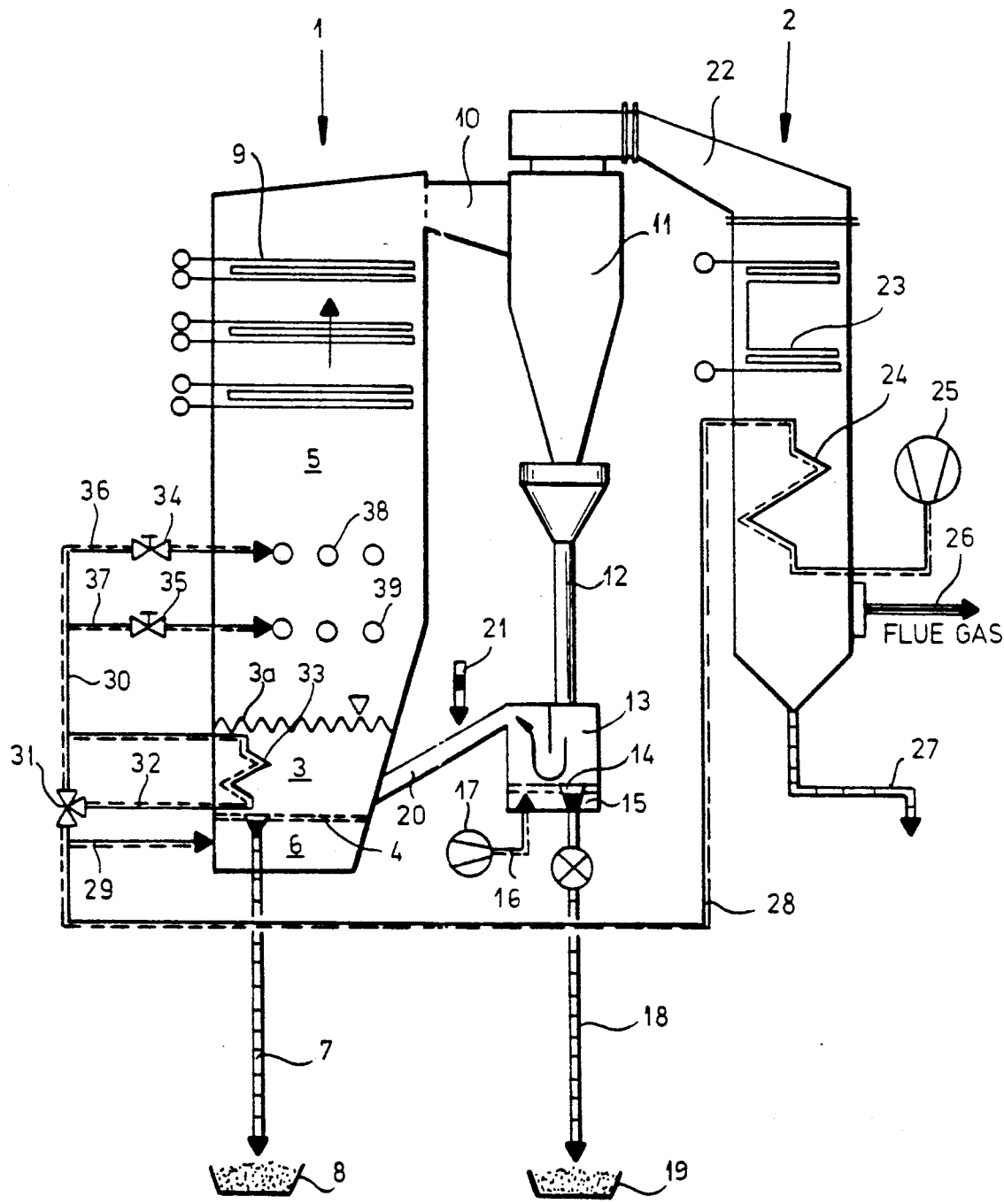
FIG. 1 is a flow diagram of a steam generating plant according to the invention having fluidized bed firing and temperature control in the free space by regulating the temperature of the secondary air fed thereto according to the invention.

The steam generator shown in FIG. 1 has two boiler zones 1 and 2. The lower part of boiler zone 1 sustains the combustion and is provided with a fluidized bed 3 with a nozzle bottom 4 above an air plenum 6. From the fluidized bed 3, an ash discharge duct 7 extends to a bed ash silo 8.

Above the fluidized bed 3 a free space 5 is formed delimited from the fluidized bed by a sharp transition in the suspension density represented by the wavy line 3a.

Above the free space 5 heating surfaces 9 are arranged and are traversed by water to be heated in the boiler. The walls of the boiler zone 1 can themselves be formed by welded tube walls traversed with water to be heated by the boiler and in the region of the fluidized bed 3 and the free space 5 can be lined with a tamping mass of refractory material for preventing attack by the combustion upon the tube walls.

The upper part of the boiler zone 1 is connected by a flue gas duct 10 with a cyclone 11. A downwardly extending stand pipe 12 runs from the funnel-shaped lower portion of the cyclone 11 into a siphon 13. This is formed as a fluidized bed with a perforated between 14 and an air plenum 15 there below. An air duct 16 from a blower 17 opens into the air plenum 15 to provide the fluidizing air for the flyash to be recycled by an overflow chute 20, connected to the upper part of the siphon 13, which delivers the metered amount of flyash to the fluidized bed 3. A coal feed represented at 21 opens into the overflow chute 20 from above.

The flue gas duct 22 extending from the cyclone 11 opens from above into the boiler zone 2 which is formed in its upper region with heating surfaces 23 which can be traversed by water. In the lower part of the boiler zone 2, an air preheater 24 is provided One side of the air preheater 24 is connected to a fresh air blower 25 while the other side is connected via a duct 28 to the primary and secondary feeds into the boiler zone 1.

A flue gas line 26 shown only diagrammatically, extends from the boiler zone 2 to a bag or fabric filter and then via a suction blower to a smokestack or chimney. From the funnel-shaped bottom of the boiler zone 2, a discharge system is provided for carrying off the excess flyash.

The preheated combustion air from duct 28 is branched to a primary air duct 29 and a secondary air duct 30. A control valve 31 branches a portion of the secondary air through a heat exchanger 33 deposited in the fluidized bed 3 and preferably in the region of a wall thereof. Above the bypass duct 32, the additionally heated secondary air is returned to the duct 30 to be mixed with the remainder of the secondary air.

The duct 30 branches into two ducts 36 and 37 provided with proportioning valves 34 and delivering the secondary air into the secondary air distributors 38 and 39 within the free space 5 of the boiler zone 1. These secondary air distributors have a grid like configuration and are formed by perforated pipes which can span the entire cross section of the boiler 1.

In operation, the preheated combustion air from the air preheater 24 at a temperature of about 150° C. in a proportion of about 60% of the total air quality, is fed as primary air through the nozzle between 4 to form a stationary weakly expanded fluidized bed 3 and effect primary combustion therein. This means, as indicated previously, that between the fluidized bed 3 and the free space 5 a clear suspension density boundary can be discerned. In the fluidized bed 3 the suspension density is only slightly less than the bulk density of the bed material. In the free space 5 the suspension density of the bed material amounts only to about 1 to 2 kg/m$^3$ and the materials entrained into the free space include combustibles as noted. The density boundary is represented by wavy line 3a showing the top of the fluidized bed 3. The dust entrained out of the fluidized bed 3 contains particles with a particle size of up to about 0.5 mm. The temperature of the fluidized bed is held constant at about 860° C. In the free space to which heated secondary air is supplied from the secondary air distributors 38 and 39, the fuel particles entrained with combustion gas from the fluidized bed are burned together with combustion gases or volatiles from the fluid bed. The residence time of the particles in the free space is about 4 seconds.

The quality of air fed to the free space is, of course, 40% of the preheated air from the air preheater 24.

In the free space, about 40% of the total heat generated in the boiler is liberated to heat the flue gas stream to a temperature of about 970° C. In the upper regions of the first boiler section 1 the gas temperature, and thus the temperature of the entrained ash particles, is reduced to about 400° to 500° C. by heat transfer to the walls of the boiler and to the heating surfaces 9 above the free space. At this latter temperature, the flue gas and the flyash entrained therewith pass into the cyclone 11. In the cyclone 11 the flyash, comprised of entrained inert fluidized bed material and fly coke, is separated out.

The flyash fills the stand pipe 12 and is pressed by the weight of the fly ash in the stand pipe into the siphon 13 where it is fluidized and caused to overflow into the chute 20 for recycling into the fluidized bed. The air quality which is fed from line 16 to deliver the flyash to the fluidized bed is metered with precision. Surplus ash is carried by the ash discharge system 18 to an ash bunker 19.

The coal is fed at 21 from a coal storage bunker as bituminous coal with a particle size up to 10 mm. The mass flow of coal and recycled flyash has the coal in a ratio to the flyash between 1:10 and 1:20. If sulfur in the fuel is a problem, lime can additionally be blown into the fluidized bed 3 or combined with the solids introduced in the fluidized bed by the chute 20. The free space temperature is maintained higher than the temperature of the fluidized bed 3. This is achieved by the additional heating imparted to a portion of the secondary air in the heat exchanger 33. In other words the heat of the secondary air to the desired temperature for delivery of the secondary air via the ducts 36 and 37 is effected by branching a variable quantity of the secondary air to the heat exchanger 33 and recombining this heated portion of the secondary air with the main flow of the secondary air to be delivered to the ducts 36 and 37. In this manner, we can bring the temperature of the secondary air blown into the free space 5, as required, up to or in excess of 600° C.

Since the fuel particles entrained as dust from the fluidized bed burn in accordance with the function $$\exp(-A/RT),$$

where $A$=activation energy, $R$=universal gas constant and $T$=temperature, a temperature increase of the secondary air results in a strong excitation of the upper combustion in the free space. Because of the relatively large portion of fuel in the entrained dust, the liberation of heat is increased and the free space temperature raised. It should be understood that this temperature increase is not a function only of the enthalpy of the hot secondary air carried into the free space, but is also a result of an increase generation of heat by combustion within the free space.

Figure 2:
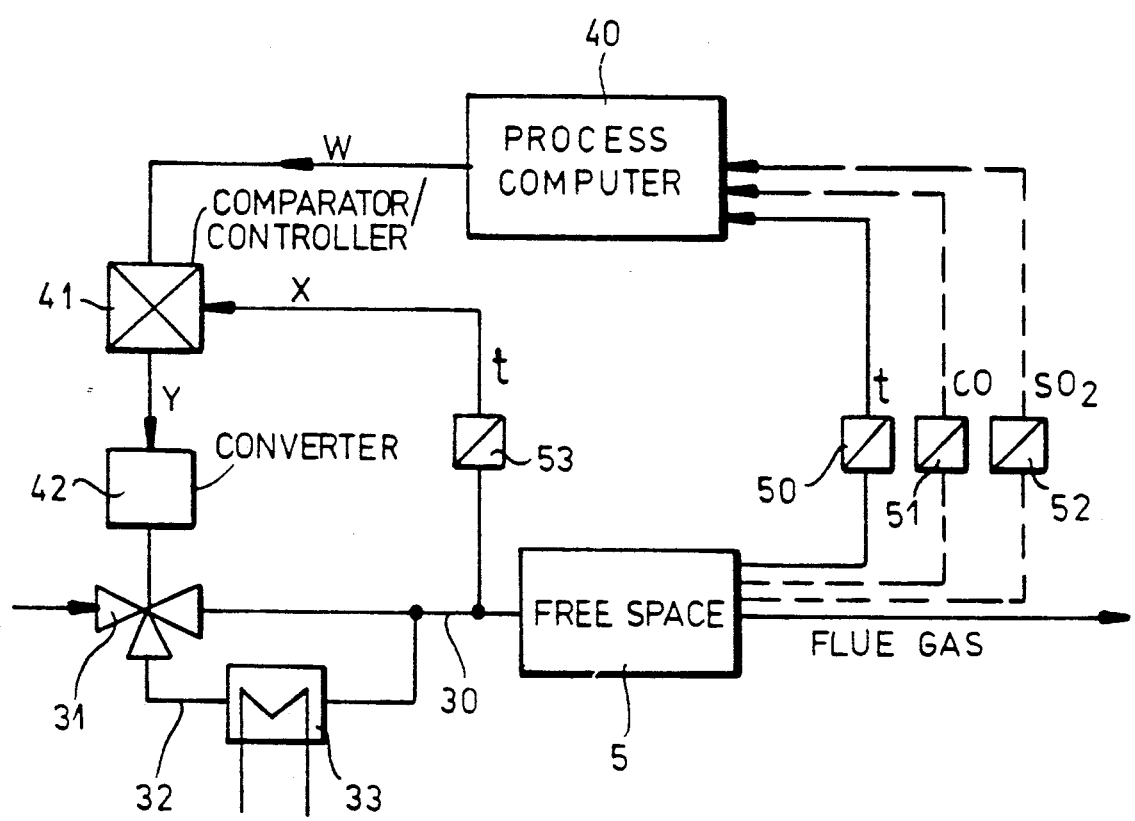
FIG. 2 is a block diagram of a control system in accordance with the invention.

FIG. 2 shows a control system for the boiler of FIG. 1. The temperature of the free space is measured and a corresponding signal forwarded by a transducer 50 to the process computer. Advantageously, the process computer also receives signals from transducers 51 and 52 signalling the carbon monoxide content and the sulfur dioxide content, respectively, of the flue gas in the free space in terms of concentrations.

Based upon a mathematical model for the temperature of the secondary air, the process computer 40 supplies a set-point value W to a comparator/controller 41 which receives a feedback or actual value signal x from the temperature sensor 53 of the secondary air after it has been additionally heated. The controller 41 outputs a control signal y to a signal converter 42 which correspondingly operates the bypass valve 31 to feed sufficient air 32 through the heat exchanger 33 to generate the requisite temperature of the secondary air.

When the secondary air is introduced in two planes as shown or more than two planes, it is possible to calculate the optimum secondary air temperature for each plane and use a signal control system for regulating the relative amounts of heated and nonheated air which are combined to feed the particular plane. A single process computer, of course, can serve to proportion the heated air between the lines 36 and 37 in accordance with this model as well.

We claim:

1. A method of burning a fuel, comprising the steps of:

(a) forming a weakly expanded fuel-containing fluidized bed of particles predominantly having a particle size above about 0.5 mm and a suspension density substantially greater than 2 kg/m$^3$ and ranging up to a bulk density of said particles, and having above said bed a free space into which particles with a particle size up to about 0.5 mm are entrained from said bed along with combustible volatile substances in combustion gases leaving said bed, said free space having a suspension density of 1 to 2 kg/m³;

(b) preheating air feeding a portion of the preheated air to said fluidized bed as primary combustion air and burning fuel in said fluidized bed with said primary combustion air and feeding another portion of said preheated air to said free space as secondary combustion air to burn fuel particles and volatiles in said free space to form a flue gas and flyash entrained therewith;

(c) recovering flyash from said flue gas and cooling said flyash;

(d) recycling at least some of the recovered and cooled flyash to said fluidized bed at a controlled rate maintaining a temperature of said fluidized bed substantially constant; and (e) controlling a temperature of said secondary combustion air fed to said free space to maintain a temperature therein which is greater than said temperature of said fluidized bed.

2. The method defined in claim 1 wherein said fuel is bituminous coal and said temperature of said fluidized bed is maintained at substantially 830° to 860° C. and the temperature in said free space is maintained at substantially 940° to 980° C.

3. The method defined in claim 1 wherein said fuel is lignite or peat and said temperature of said fluidized bed is maintained at substantially 750° to 800° C. and the temperature in said free space is maintained at substantially 800° to 860° C.

4. The method defined in claim 1 wherein said fuel is sludge or refuse and said temperature of said fluidized bed is maintained at substantially 820° to 900° C. and the temperature in said free space is maintained at substantially 860° to 950° C.

5. The method defined in claim 1 wherein a part of said secondary combustion air is heated in indirect heat exchange with said fluidized bed and is then mixed in variable quantities with another part of said secondary combustion air for feeding to said free space.

6. The method defined in claim 1 wherein heat is abstracted from said flue gas by passing a fluid to be heated through passages above said free space.

7. The method defined in claim 6 wherein said flyash is recovered from said flue gas in a cyclone, said method further comprising fluidizing said flyash with air before transferring the recovered and cooled flyash to said fluidized bed.

8. The method defined in claim 7, further comprising abstracting additional heat from said flue gas downstream of said cyclone by passing a fluid through passages in heat exchanging relationship with said flue gas.

9. The method defined in claim 8 wherein said preheating of said air is effected in indirect heat exchange with said flue gas after the abstracting of said additional heat therefrom.

10. An apparatus for burning a fuel, comprising:

means for forming a weakly expanded fuel-containing fluidized bed of particles having a particle size above about 0.5 mm and a suspension density substantially greater than 2 kg/m³ and ranging up to a bulk density of said particles, and having above said bed a free space into which particles with a particle size up to about 0.5 mm are entrained from said bed along with combustible volatile substances in combustion gases leaving said bed, said free space having a suspension density of 1 to 2 kg/m³;

means for preheating air feeding a portion of the preheated air to said fluidized bed as primary combustion air and burning fuel in said fluidized bed with said primary combustion air, and feeding another portion of said preheated air to said free space as secondary combustion air to burn fuel particles and volatiles in said free space to form said flue gas and flyash entrained therewith;

means for recovering flyash from said flue gas and cooling said flyash;

means for recycling at least some of the recovered and cooled flyash to said fluidized bed at a controlled rate maintaining a temperature of said fluidized bed substantially constant; and means for controlling a temperature of said secondary combustion air fed to said free space to maintain a temperature therein which is greater than said temperature of said fluidized bed.

11. The apparatus defined in claim 10 wherein said means for controlling a temperature of said secondary combustion air fed to said free space includes means for passing a first part of said secondary combustion air in indirect heat exchange with said fluidized bed, and means for thereafter mixing said first part of said secondary combustion air with another part of said secondary combustion air in variable ratios to maintain said temperature in said free space which is greater than said temperature of said fluidized bed.

* * * * *